E. T. WILLIAMS.
ICE MAKING AND HARVESTING APPARATUS.
APPLICATION FILED APR. 12, 1910.
1,051,296.
Patented Jan. 21, 1913.
9 SHEETS—SHEET 2.
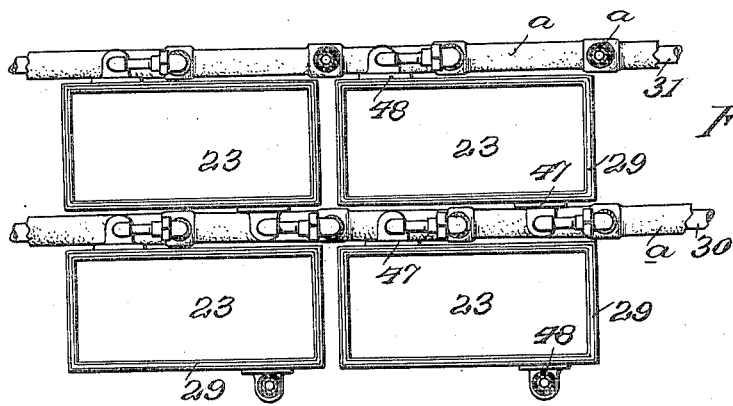
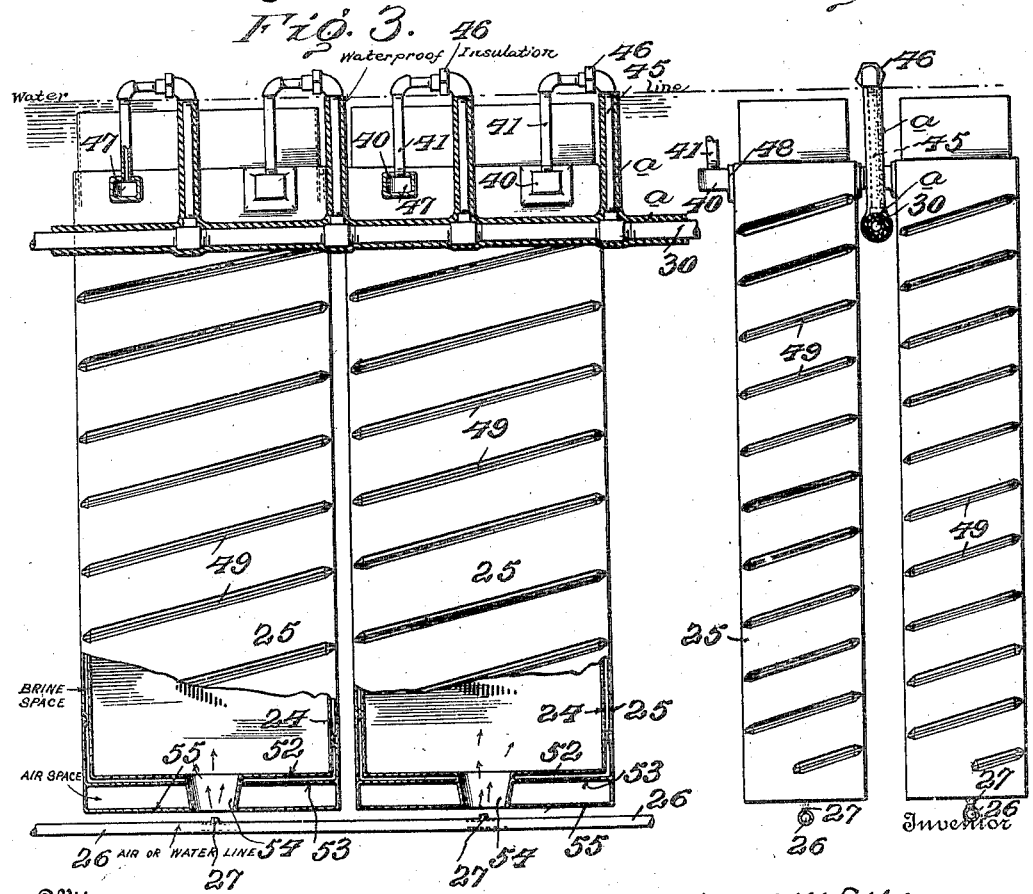

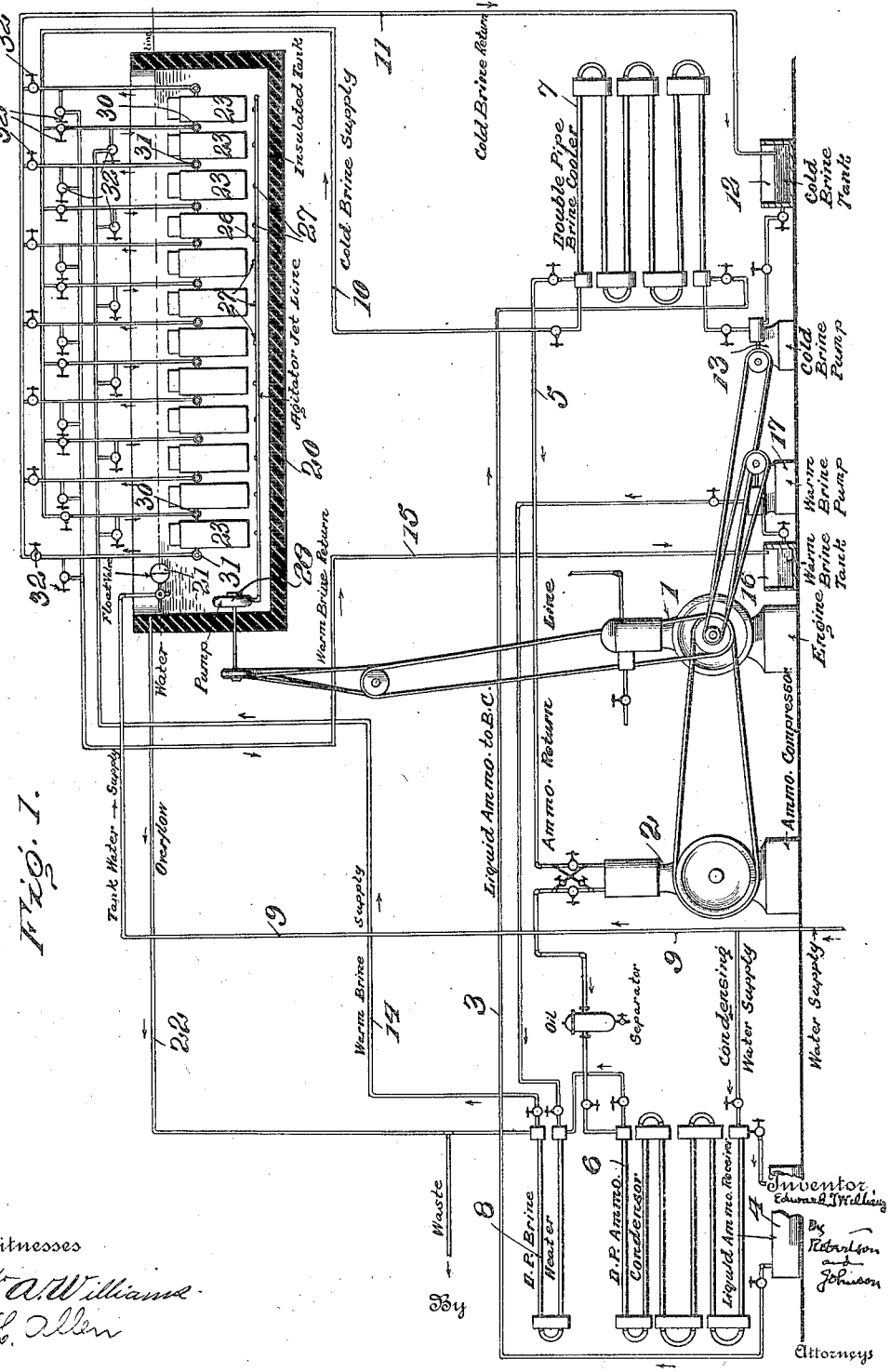

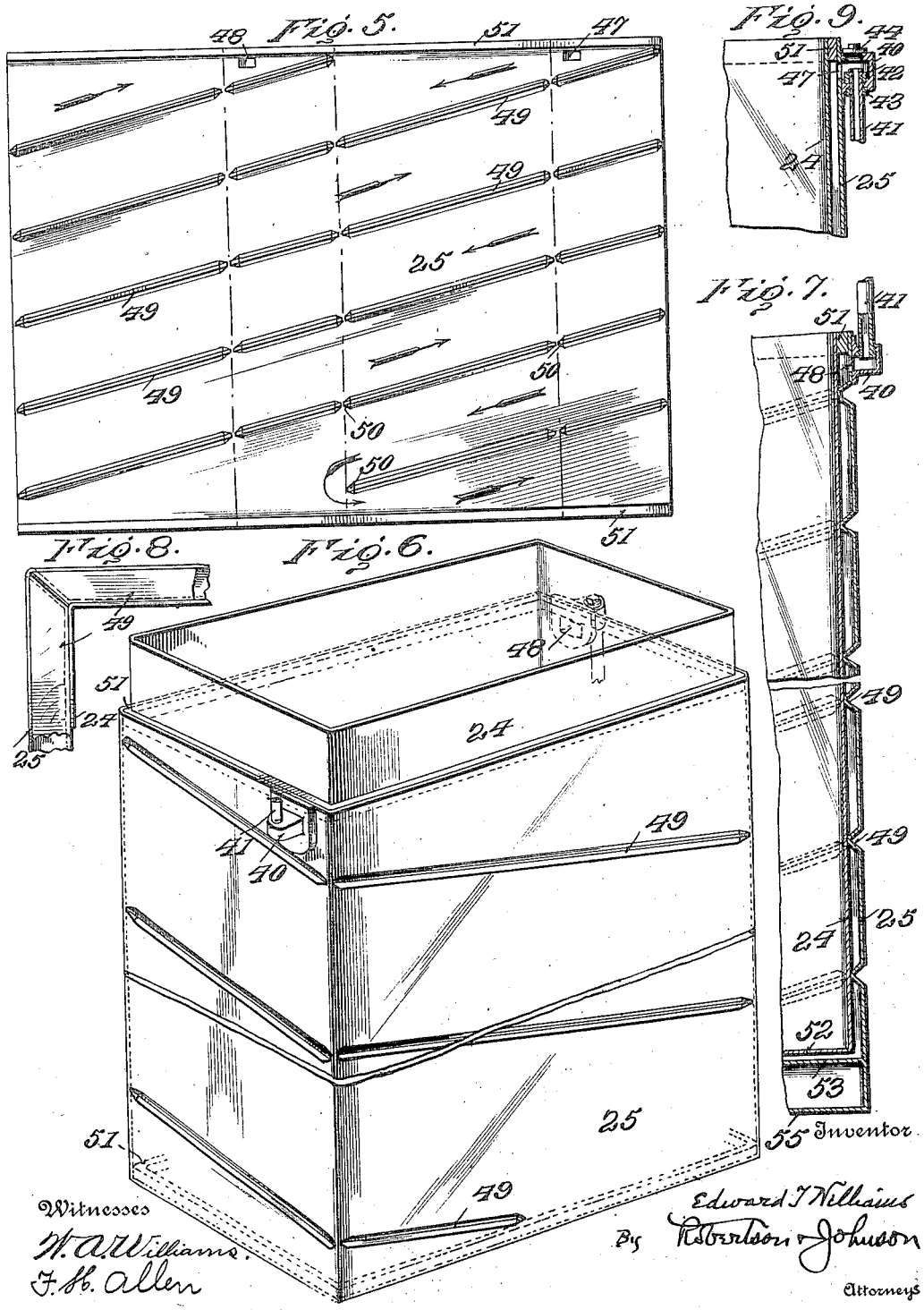

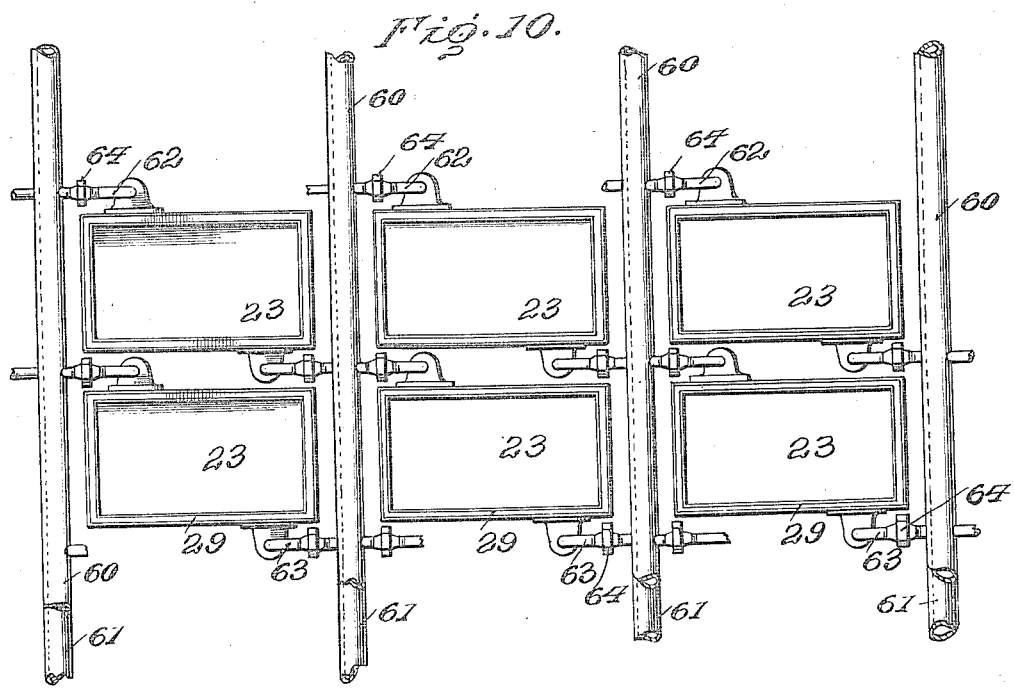
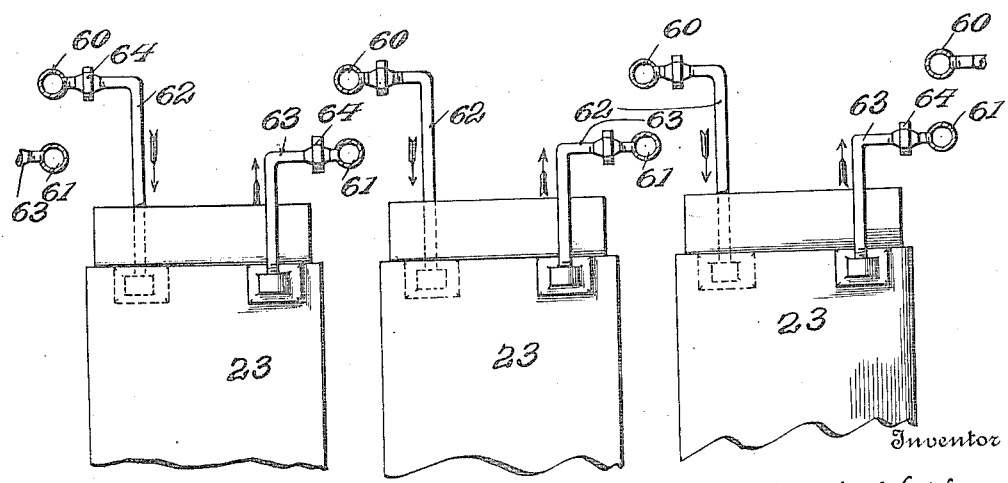

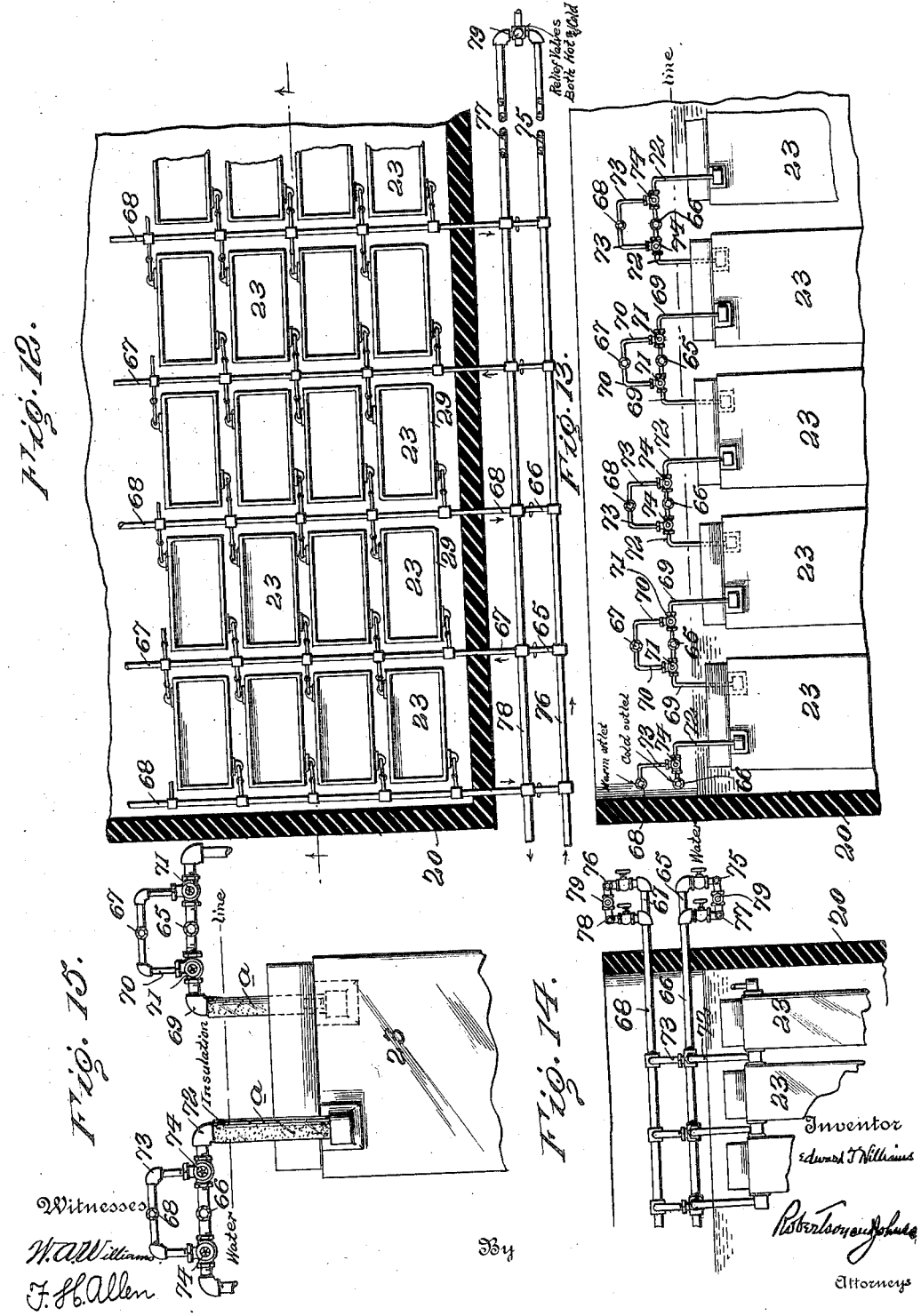

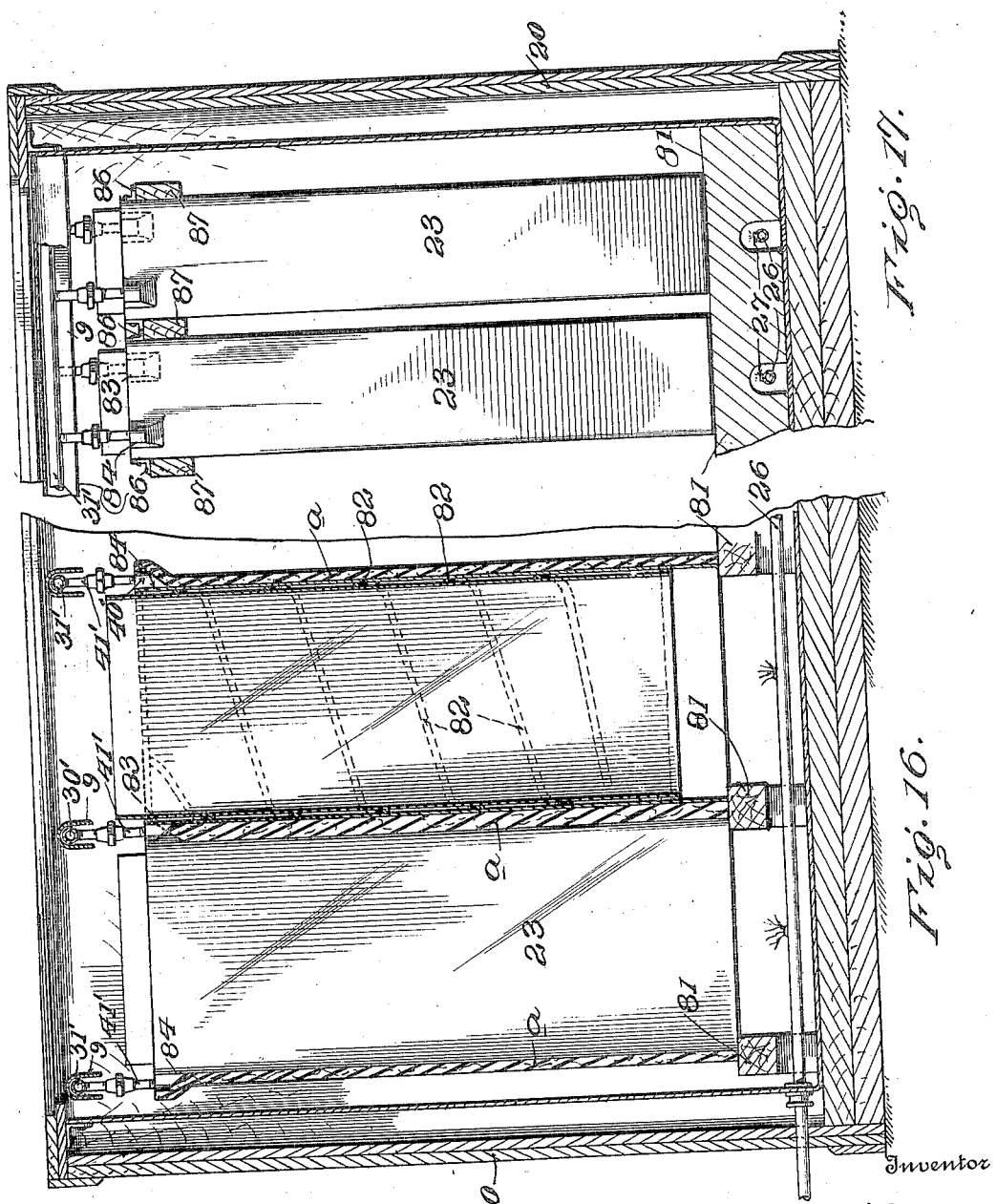

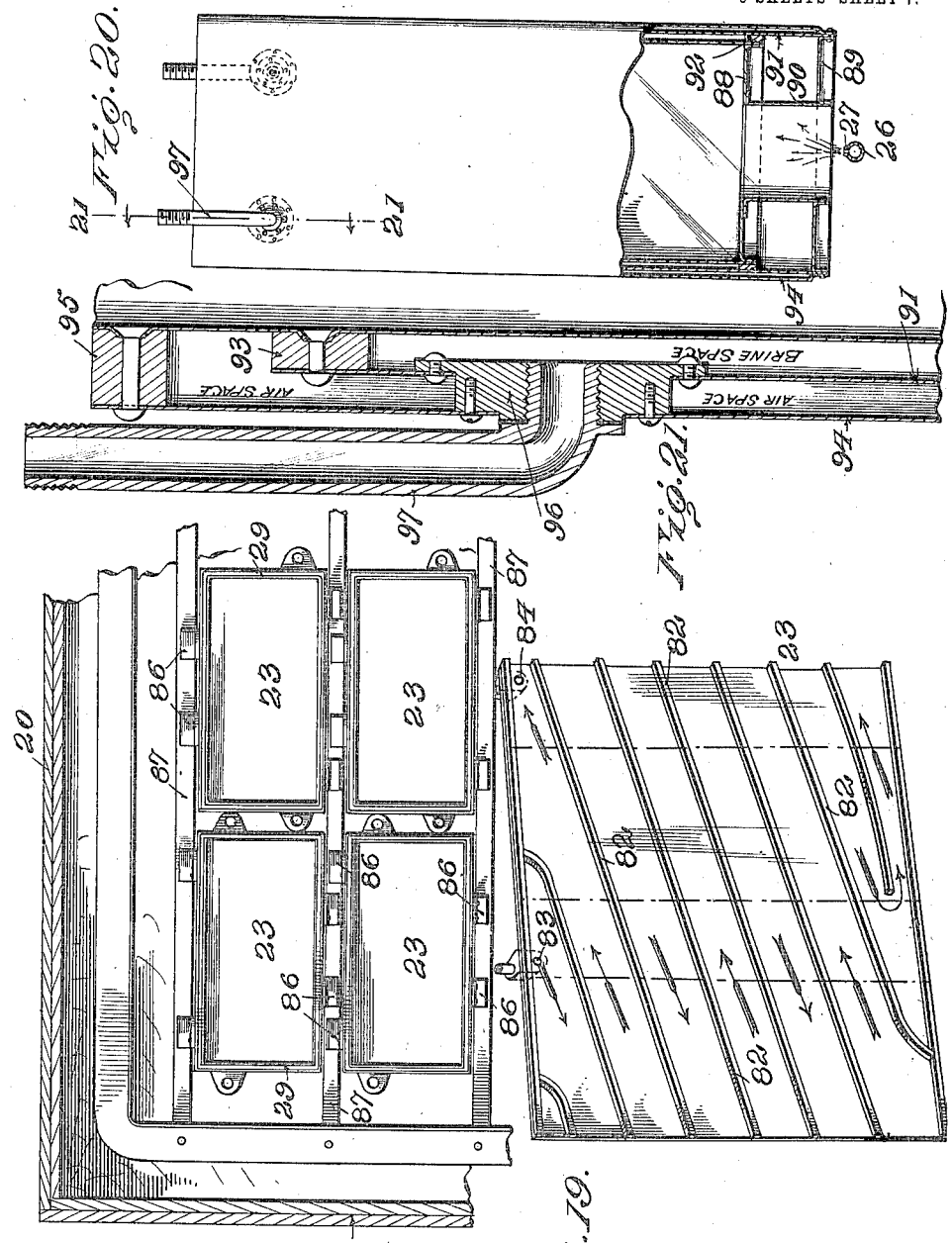

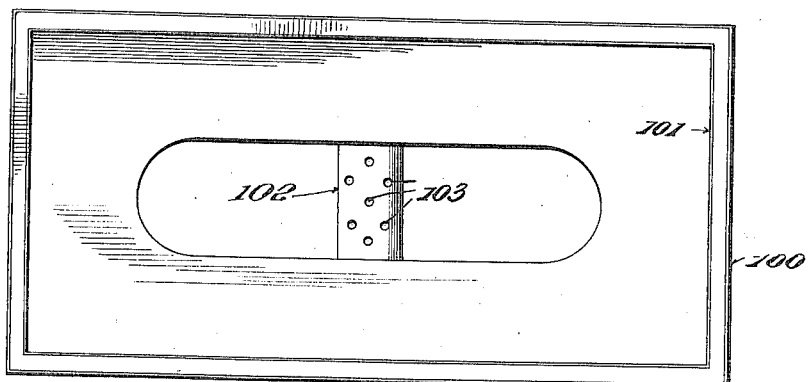
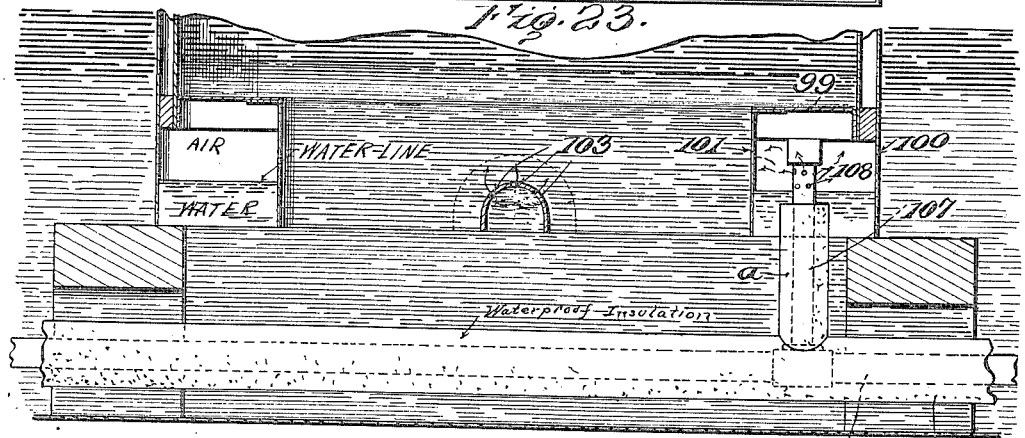
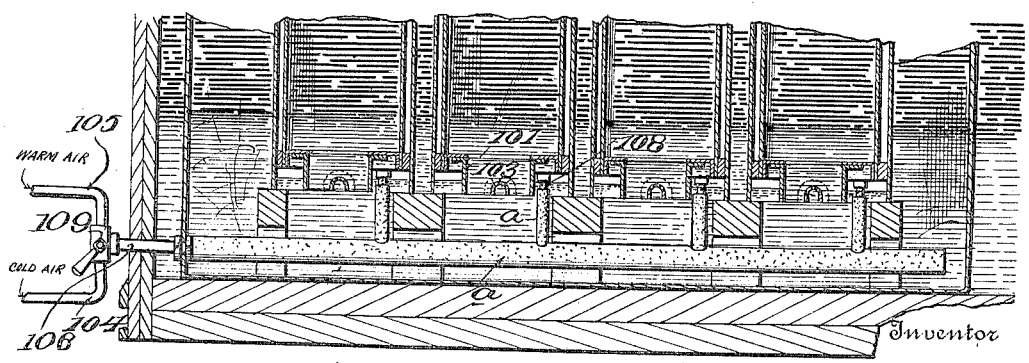

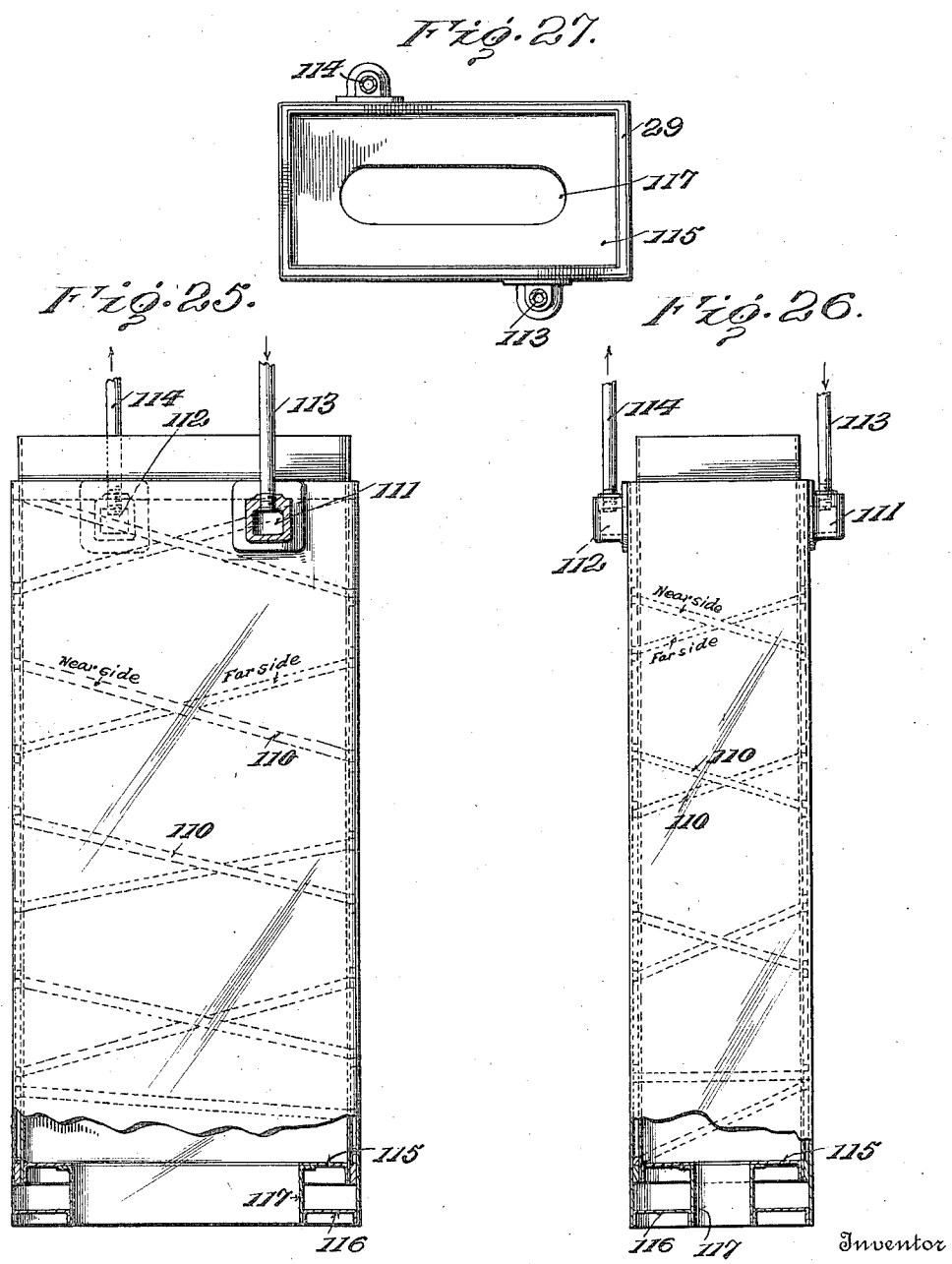

UNITED STATES PATENT OFFICE.

EDWARD T. WILLIAMS, OF BROOKLYN, NEW YORK.

ICE MAKING AND HARVESTING APPARATUS.

REISSUED

1,051,296.

Specification of Letters Patent. Patented Jan. 21, 1913.

Application filed April 12, 1910. Serial No. 554,943.

*To all whom it may concern:*

Be it known that I, EDWARD T. WILLIAMS, a citizen of the United States, and a resident of Brooklyn, in the county of Kings and State of New York, have invented certain new and useful Improvements in Ice Making and Harvesting Apparatus, of which the following is a specification.

My invention relates to ice making and harvesting apparatus and more particularly to apparatus of this character of the type in which upright freezing molds are located in a tank containing the water to be frozen and in which the ice is harvested without the necessity of removing the molds. Systems of this nature have numerous advantages but have been subject to certain defects, one of the most serious of which is the excessively long time required to freeze and to harvest. This arises from the fact that the freezing agent and the thawing agent have been applied in an ineffective and uneconomical manner, the custom being to employ coils spaced along the mold walls and running at right angles to each other throughout the tank past all of the various molds, in such a way that there was much waste in freezing and thawing water not in the molds and in cooling or warming the apparatus itself, and that the freezing action was irregular, the freezing agent varying considerably in temperature at its points of inlet and outlet. Another defect lies in the necessity of operating the entire tank as a unit and in the fact that all the molds must be subjected simultaneously either to freezing or to thawing action, it being impossible to select any particular mold or group of molds for harvesting while continuing the freezing action with respect to another or others.

The object of my invention is to remedy these and other defects and to secure rapidity, efficiency, economy and exact control in freezing and harvesting. The manner in which these results are secured will be more fully apparent from the following specification, but it may be stated at this point that I construct the apparatus in such a manner as to completely wrap the freezing zone of each mold with a rapidly circulating covering of the freezing or thawing agent, and employ such arrangements of piping and connections as to secure any desired minuteness of control to enable one part of the apparatus to be subjected to freezing action at the same time that another part is being subjected to thawing action, it being possible in my preferred construction to treat each mold individually as desired without reference to any other mold.

Although I have illustrated my invention as embodied in apparatus of the type above referred to in which the molds are located within the tank, I do not wish to be understood as limiting it to apparatus in which the molds are so located except where the claims specify this location. Furthermore, while I prefer freezing and thawing jackets individual to each mold, it will be obvious that this is not the only possible embodiment of my invention.

My invention thus deals with the apparatus or system in general and also with the construction and relative arrangement of the individual molds, several forms of which are illustrated and will be hereinafter described.

An efficient mode of applying the freezing and thawing agents is shown in each mold illustrated, the individual molds being surrounded with a continuous, circuitous passage or conduit for refrigerating or thawing fluid which forms a complete covering or wrapping for the freezing zone of the mold and which constitutes a freezing and thawing jacket. This conduit is preferably flat and of the most advantageous shape and dimensions for its purpose. I have illustrated it as constituting a part of the double walled mold. Both the inlet and outlet ends of the said conduits are located at the top of the freezing zone where access to them is convenient. The construction of the mold bottoms and the means employed for preventing the ice blocks from sticking thereto are also regarded as novel and important.

Other features of the invention will more fully appear hereinafter and will be pointed out in the appended claims.

Referring to the drawings: Figure 1 is a diagrammatic view of the entire system. Fig. 2 is a plan view showing a few of the tanks with their supply and return headers. Fig. 3 is a side elevation partly in section corresponding to Fig. 2. Fig. 4 is an end elevation corresponding to Figs. 2 and 3. Fig. 5 is a development of the inside of the outer mold casing showing the preferred form thereof. Fig. 6 is a perspective view of the complete mold of this form, the bottom being illustrated as open. Fig. 7 is a vertical section through the said mold, the bottom, however, being shown as closed in part. Fig. 8 is a plan view of a corner of the mold. Fig. 9 is a vertical section showing the hollow lug and connecting pipe. Fig. 10 is a plan view illustrating a system of connections whereby each row of molds may be treated individually. Fig. 11 is an elevation corresponding to Fig. 10. Fig. 12 is a plan view illustrating the system of connections for individual treatment of each mold. Fig. 13 is a side elevation corresponding to Fig. 12. Fig. 14 is an end elevation corresponding to Figs. 12 and 13. Fig. 15 is a detail view showing the connections of one of the molds as employed in the construction shown in the preceding three figures. Fig. 16 is a vertical section showing the mold supported from below and illustrating also a modified form of mold. Fig. 17 is a vertical section at right angles to the section shown in Fig. 16, the construction being modified by the omission of insulation around the molds and the molds being suspended from above instead of being supported from below as in Fig. 16. Fig. 18 is a plan view corresponding to Fig. 17. Fig. 19 is a development in perspective of the inside of the outer mold. Fig. 20 is an elevation partly in section showing an air jacketed mold. Fig. 21 is a detail sectional view illustrating the construction of the said mold. Fig. 22 is a plan view of a mold having the preferred form of bottom. Fig. 23 is a vertical section through the same showing also the air feeding pipe. Fig. 24 is a vertical section showing a plurality of molds of the kind illustrated in Figs. 22 and 23 and showing the air pipe connections. Fig. 25 is an elevation partly in section of another form of mold. Fig. 26 is an end elevation thereof and Fig. 27 a plan view.

Referring especially to Fig. 1, which is a diagrammatic view of the entire system, 1 designates the prime motor illustrated as a gas engine; 2 the ammonia compressor; 3 the ammonia feed line; 4 the liquid ammonia receiver; 5 the ammonia return line; 6 the ammonia condenser; 7 the brine cooler; 8 the brine heater; 9 the water supply which after passing through the ammonia condenser serves to heat the brine; 10 the cold brine supply pipe; 11 the cold brine return pipe; 12 the cold brine tank; 13 the cold brine pump; 14 the warm brine supply pipe; 15 the warm brine return pipe; 16 the warm brine tank, and 17 the warm brine pump. The action of systems of this character is well known and need not be detailed. It is sufficient to say that through the means described or any other well known means of similar character cold brine or warm brine or other suitable freezing or thawing fluid may be supplied to the apparatus about to be described.

The insulated tank 20 is filled with water, a continuous flow being maintained, preferably automatically, as by a float valve 21 governing the water supply pipe 9, an overflow pipe 22 being provided. Within this tank the freezing molds 23 are arranged in parallel rows, the molds being preferably submerged so that, when ice formed in them is released by warming the molds, the water in the tank floats the cakes high enough so that they may be grasped by tongs or otherwise conveniently removed. During the process of freezing this submerged location of the molds is also desirable, since it enables impurities to pass from the molds into the water above them and finally through the overflow out of the tank. The molds are preferably supported from below, but they may be suspended, both arrangements being illustrated. In systems of this character it is customary to provide means for agitating the water within each mold by delivering an air jet thereto at the bottom. For a similar purpose I employ a series of jet lines 26 having jet openings 27 through which fluid under pressure is forced. These jet lines may conduct air under pressure, but in Fig. 1 are illustrated as supplied with water from the tank by the pump 28 driven from the engine 1 and submerged in the tank. For certain purposes water is preferable, since there is no danger that it will increase the temperature or introduce impurities. I prefer, however, to use water, and also air delivered in a special manner by additional jet lines. This construction will be hereinafter described.

In the drawings, I have shown several different arrangements of hot and cold brine connections and before describing in detail the freezing molds of my invention, I will explain the system and the connections as illustrated in Figs. 1, 2, 3, 16 and 17. 29 designates the freezing and thawing jackets of the various molds. These preferably stop short of the top of the mold for well known reasons and may also stop short of the bottom. Each of these jackets preferably consists of a continuous conduit or passage as will be more fully explained hereinafter. The freezing or thawing medium is supplied to the freezing jackets by cross headers 30 and returned therefrom by cross headers 31, one end of each conduit being connected to a supply header and the other to a return header, the molds thus being connected in parallel. These headers are conveniently located adjacent to rows of molds and between them but may be arranged above the molds as illustrated in Figs. 16 and 17. It is preferable to submerge these headers for the reason that they are then out of the way and may be made more flexible without risk than would otherwise be possible. The supply cross headers 30 are each connected to the cold brine supply pipe 10 and to the warm brine supply pipe 14, while the return cross headers 31 are each connected to the cold brine return pipe 11 and to the warm return brine pipe 15. Suitable valves 32 control the connections so that the cold brine can be turned on and the warm brine turned off or vice-versa. Individual valves have been shown for clearness, but it is plain that three-way valves may be employed for convenience. Other valves, the purpose of which is evident and which need not be further particularized, are shown. It will be apparent that with this arrangement it is not necessary to operate the entire tank as a unit, but that freezing may be going on in one part of the tank by means of certain cross headers, while at the same time other cross headers are conveying warm brine to the rows of molds, which they serve, to harvest the ice therein.

As already suggested one of the great advantages of my invention is speed and economy both in freezing and in harvesting. This is due especially to the application of the freezing or thawing agent directly to the mold walls and thus to all freezing surfaces of the block, to its rapid circulation thereover, and to insulating the parts of the apparatus carrying said agents, so that limitation of freezing or thawing action to the desired location is secured. In freezing rapidity of circulation is important since since the speed of freezing varies largely as the speed with which the refrigerant moves. Instead of having to thaw out the whole tank in harvesting, it is necessary merely to melt a thin film of ice probably not more than one hundredth of an inch thick to release the block which by its buoyancy assisted by the mold taper (not shown) readily frees itself. Where, on the contrary, the old construction with pipes in the tank is used, even where they are in contact with the outer wall of the mold, this contact if the pipes are round is only a line, and before any appreciable amount of heat can be transmitted, it is necessary to break down crystallization in the ice surrounding the pipe. It is then necessary to melt out the ice between the molds. Heat is lost at all parts of the pipe except the single line in contact with the mold so that it is obvious that there must be a great waste.

The connections from the headers to the mold jackets may vary, but are conveniently such as to enable individual molds to be removed. Referring to Figs. 2–4, the mold jackets are each provided with hollow lugs 40 to the top of which the pipes 41 from the header are secured. The relation of the pipes 41 to the lugs 40 may be permanent, disconnection being effected elsewhere when desired, but the lug may have two openings as in Fig. 9 into either of which the pipe may be screwed, suitable washers 42, 43 being provided, and a plug 44 closing the opening not in use. Fig. 3 shows the better arrangement in which the pipes 41 are connected permanently to the lugs 40 and disconnectibly to the pipes 45 leading from or to the headers 30 or 31 by unions 46. The cross headers 30—31 and the pipes 45 are insulated at "$a$" with non-conducting water-proof cement or other material of suitable character. Insulation may also be used on the rest of the connections but is preferably omitted where it would interfere with the disconnection of the parts. This arrangement makes it possible to remove individual molds, whenever this becomes necessary for repairing or replacing them, without interferring with the operation of the system, it being merely necessary to plug up the open ends of the pipes 45.

Within the scope of my invention I may employ various mold constructions several of which are shown. Of these I prefer in some respects that illustrated particularly in Figs. 3–9, although the mold is made more effective by the addition of an insulating jacket as in Figs. 20 and 21, and although I prefer the bottom construction illustrated in Figs. 22–24. This mold is of the customary or other suitable size and shape, having a draw to assist the ice block to free itself, is double walled and has a continuous, circuitous substantially spiral passage or conduit formed in said double wall, the passage starting at the inlet 47 and ending at the outlet 48. The inside wall 24 of the mold is plain but the outside wall 25 has inwardly projecting ridges or depressions 49 formed from the substance of the sheet constituting the outer wall. These ridges are substantially V-shaped in cross section and are preferably substantially parallel. They are of uniform depth so that, when the outer shell is in position, their inner edges are at the same time in continuous contact with the inner wall of the mold. Until the mold is made up, these ridges are not continuous, but are divided into parts ending, with the possible exception of the first ridge at the top and the last ridge at the bottom, adjacent the lines of fold. The ends 50 of each of these ridges adjacent the line of fold slant at an angle of 45° so that when the sheet which is to form the outer wall of the mold is folded together into a shell these ends form a miter as shown in Fig. 8. It will be understood that after the outer shell has been formed in the manner stated and riveted into a rectangular tube having an open end, the inner mold or shell formed in the usual manner would be inserted and the two riveted together, the rivets being spaced along the depressions in the outer shell and also along the bands at the top and bottom. With respect to this construction it is to be borne in mind that the passage between the two walls of the mold need not be fluid tight since some leakage might occur from one portion of it to the next without injurious effect. This construction has flexibility which is desirable to enable the mold to withstand the strain due to expansion and contraction. Where the molds are to be manufactured in quantity this construction is especially advantageous, since it will be readily apparent on inspection of Fig. 5 that the outer sheet may be pressed. This mold is thus simple and cheap when once the die forms have been made. In the mold as shown in Fig. 6 the space between the inner and outer walls at the bottom and at the top of the freezing zone is closed by suitable means as by the frames 51. The mold as shown in this figure is open at both ends, but I consider preferable the construction shown in Figs. 3 and 7 in which the mold has a double walled bottom 52—53 closed except for an opening 54 above the fluid jet 27. Within this double bottom the freezing agent circulates so as to freeze the block square on the bottom and avoid the necessity of any waste by reason of squaring it after it is removed from the mold. It is preferable also to provide a third bottom wall 55 between which and the wall 53 is a dead air insulating space. This is a desirable construction particularly where large blocks are to be frozen. It will be noted that it combines the advantages of the closed bottom mold with those of the open bottom mold, the hole in the bottom permitting the desired circulation of water within the mold. Particularly where the hole 54 is round, the jet of air or water passing up through it has an injector action tending to carry with it water from the tank. The object of the insulating space is of course to prevent freezing of the water in the tank below the mold and to avoid waste by the transference of heat units where this is not desired.

The general arrangement of connections above described, and illustrated in the figures already particularly referred to, is relatively inexpensive and convenient and permits the operation of the tank otherwise than as a unit. It does not, however, allow each row of molds to be operated as desired without reference to the operation of the adjacent row of molds. To accomplish this purpose I may provide connections as illustrated in Figs. 10 and 11 in which each row of molds is provided with two headers, a supply header 60 and a return header 61 which are connected to the freezing and thawing means of individual molds, the supply headers 60 by the pipes 62 and the return headers 61 by the pipes 63, these pipes being provided with unions 64 whereby the molds are made individually detachable. It will be obvious that these connections may be used with molds of various constructions. As with the connections described above, the freezing or thawing agent passes from a supply header around a mold and then at once to the return header, so that the most effective action is secured, the freezing agent not being circulated sufficiently to change unduly in temperature before it is again returned to the system and restored to its original temperature. The advantage of being able to freeze one row of molds while thawing the molds of the adjacent row is apparent. Obviously it will be easy to provide in the connections shown in this, or in the other figures, valves to shut off individual molds. Where a still more minute control is desired I employ the system of connections shown in Figs. 12 to 15 inclusive which makes it possible to treat each individual mold as desired without reference to any other mold. In order to accomplish this result I provide adjacent each row of molds two supply headers and two return headers, the supply headers 65 and the return headers 66 carrying the freezing agent and the supply headers 67 and the return headers 68 carrying the thawing agent. The cold supply headers 65 are connected by pipes 69 to the inlets of the molds in the adjacent rows. The warm supply headers 67 are connected by pipes 70 to the pipes 69. At the junction of these pipes 69 and 70 are provided three way valves 71, whereby as will readily be apparent, freezing agent may be admitted to the mold jacket inlet, thawing agent may be admitted, or both may be excluded. Similarly the outlets of mold jackets of adjacent rows are connected by pipes 72 to the return headers 66 and the pipes 72 are connected by pipes 73 with the return headers 68. At the junction of the pipes 72 and 73 are provided three way valves 74, which serve to control the return in the manner just specified with respect to the control of the supply. These headers are supplied with freezing agent and with thawing agent by supply mains or headers 75—76, the first of which conducts the freezing agent and the second the thawing agent. Similarly return mains 77 and 78 carrying respectively the freezing agent and the thawing agent are provided, and to these mains the various headers above referred to are suitably connected. Relief valves 79 are provided both in the warm and in the cold mains. It is not necessary to the successful working of the system that the pipes carrying the freezing agent should be insulated but efficiency is greatly increased thereby. Accordingly, in Fig. 15 I have shown insulation "a" applied to the pipes 69 and 72. This insulation is preferably water-proof cement of suitable character, although of course I am not limited thereto. It will be understood that this mode of connection of the various molds is of wide utility and that it may be employed with molds of various constructions.

It has already been stated that the molds may be supported from below or may be suspended, and that the molds need not be constructed with an outer shell having ridges or depressions although as stated this is the preferred form. In Figs. 16–19 constructions are shown illustrating these statements, Fig. 16 showing molds supported from the bottom, and Figs. 17 and 18 a substantially similar construction in which the molds are, however, suspended. The general plan of the connections is that illustrated diagrammatically in Fig. 1 and the system is the same, although the construction differs from that of Fig. 3 in that the supply and return headers 30', 31' are located above the molds instead of between them. The lugs 40' and the connecting pipes 41' also differ in detail from those shown in Fig. 3. The molds 23, as shown in Fig. 16, are supported by wooden beams or strips 81, which not only serve the purpose stated, but also prevent undue freezing at the bottom of the molds. It will be noted in this connection that the molds shown in these figures are open at both ends. The circuitous passage for the freezing agent is formed by a division strip 82 winding around between the double walls of the mold 23 and suitably secured to one or both of them. No detailed explanation is necessary since the operation of these molds is the same as that already described, the freezing or thawing agent passing from the inlet 83 at the top of the mold to the outlet 84, also at the top of the mold, by the winding or double spiral path indicated by the arrows. It will be noted also that Fig. 16 shows the molds covered with insulation "a", the entire space between adjacent molds being filled up, as indicated, so that the molds are embedded solid in insulation, water-proof cement of suitable character being preferred. It will be understood at once that this is an advantageous arrangement, since it prevents the transference of heat units where this is not desired and makes the entire operation useful, thus eliminating waste which is a very serious item in present open can systems. While insulating cement is indicated some other mode of insulation may be used, for instance, each mold may be incased in a wooden box saturated with pitch and paraffin. The preferred mode, however, will be more fully described in connection with other figures and consists in providing the molds with dead air jackets which may be of such size as to substantially fill the space between the molds. The construction shown in Figs. 17 and 18 requires but a few additional words. In these figures the molds are provided with brackets 86 which rest upon bars 87 from which the molds are suspended. The space between the molds may in this construction also be filled with insulation as shown in Fig. 16, or the insulation may be omitted as shown in Figs. 17 and 18. The arrangement of the strip whereby the double spiral passage is formed as well as the direction of flow of the fluid is shown in Fig. 19.

Figs. 20 and 21 show a mold exhibiting the preferred mode of insulation. This mold has a freezing and thawing jacket of the desired character. It also has a bottom 88 and a bottom 89 spaced therefrom to constitute an insulating dead air space. 90 is a shell connecting these two bottoms and inclosing a hole through which the air or water jet plays. The outer wall 91 of the mold passes down beyond the frame 92 to the lower bottom 89. There is a corresponding frame 93 closing the upper part of the brine space above which the inner wall of the mold preferably extends. The sides of the mold thus formed are surrounded by a dead air space formed by the casing 94 which extends from the bottom 89 to the frame 95 at the top. Bushings 96 are secured to the outer wall 89 and the casing 94. Into these bushings are screw-threaded pipes 97 forming inlets and outlets to and from the brine space. It will be understood that any of the molds illustrated herein, or indeed others, may be provided with a casing and dead air space as suggested in these figures.

In Figs. 22–24, I have shown a construction of mold bottom and an arrangement of means for delivering cold or hot air thereto and to the interior of the molds which I regard as superior to the double bottom above described. In this construction the freezing zone need not extend under the bottom 100 of the can or form a part of the bottom. Moreover the lower bottom wall which in the other constructions forms with the upper bottom wall a dead air space is omitted, the water acting as a seal trapping air between its surface, the bottom 99, the extended inclosing mold wall 100, and the shell 101 which surrounds the hole through the bottom of the can and is surrounded by the air space. This shell is preferably provided with a central bridge opening on the said air space and having perforations 103. As indicated in Fig. 24, each of the molds has its bottom constructed in this manner and I provide a system of piping for delivering hot or cold air to the space below the bottom 99, from which it is directed by the bridge 102 to the perforations 103 from which it escapes to the interior of the mold. 104 represents the cold air pipe; 105 the warm air pipe and 106 one of the cross headers from which extend up delivery pipes 107 having capped perforated heads 108. To prevent the cooling of the warm air during its passage through the tank, the pipes within the tank are provided with water-proof insulation "a" as indicated. The supply of air to each cross header is controlled by a three way valve 109. It is not necessary to provide individual control for each mold. The principal purpose of this construction is to avoid any possible difficulty with respect to the sticking of the block at the bottom of the mold in harvesting, while at the same time facilitating the freezing action during the freezing operation and agitating or assisting to agitate the water in the mold. During freezing air of ordinary temperature, or air passed through a cooler, is delivered to the cross header or headers 106 from which it passes by the delivery pipes 107 to the water sealed bottoms in the space above the water level, thus assisting in cooling the bottom and the water in communication therewith and the excess displacing the water sufficiently to pass out through the perforated heads to the bridge 102 and so up through the mold causing or increasing the desired agitation. During harvesting the three way valve is so turned as to exclude the cold air and to admit warm air to the cross header or headers 106, the delivery pipes 107, the bridge 102, and, through the perforations 103, to the interior of the mold, thus heating up the bottom parts of the mold and preventing the block from sticking at this point. The air may be heated in any desired way as by steam jacketing a section of the air line outside of the tank or by employing exhaust from the gas engine in a similar jacket. This construction may be employed without interfering with the submerged pump and water jet line. It will be apparent that a bottom of this character may be employed in connection with various kinds of molds such as those above described or in connection with others for that matter. This construction I consider particularly advantageous as removing any possibility of difficulty in the operation of the apparatus. The application of thawing fluid to the walls and bottom of the mold in contact with the frozen ice cake is very advantageous, whether the means for applying it to the bottom is separate from the freezing and thawing jacket, as in the construction just described, or a part of it, as in Figs. 3 and 7. This insures the formation of a cake having its bottom of proper shape, and the certain and quick release of the cake from the mold. The latter object is, however, best effected by an auxiliary thawing chamber or hot air pocket of which a desirable form is illustrated in Figs. 23 and 24.

Another form of mold embodying my invention and one which may be readily and cheaply constructed is illustrated in Figs. 25-27. This mold like the rest is double walled, the passage or conduit between the walls being formed by bars 110 which constitute divisions for this purpose and form a continuous, circuitous passage. An inlet 111 and an outlet 112 with corresponding supply and return pipes 113 and 114 respectively are provided. The mold has a double bottom 115, 116 and a shell 117 constituting an air space, being constructed in this respect like the mold shown in Fig. 20, so that further explanation is needless.

Several different arrangements of connections have been described. The one shown in Figs. 12-15 which permits the individual treatment of the molds is considered the best, but where it is desired to save expense one of the other methods may be employed in whole or in part.

While it is a very great advantage to connect the individual freezing and thawing means for individual molds in parallel to the supply and return headers, the claims are not all designed to be limited to this mode of connection, since series arrangements, though undesirable, are possible.

By referring to the molds as "open at the top," I do not of course mean to imply that they may not have removable covers when their tops are accessible.

What I claim as my invention is:

1. Ice making apparatus comprising in combination, a water tank, upright molds therein open at the top and in communication with the tank at the bottom, individual freezing means surrounding each mold, a system for supplying freezing fluid to said individual means and for returning it therefrom, connections between said system and means, and a supply line for delivering fluid under pressure to agitate the water in the molds.

2. Ice making apparatus comprising in combination, fluid cooling means and fluid heating means, a system of pipes for handling the cold fluid, a system of pipes for handling the warm fluid, a water tank, a plurality of upright freezing molds therein open at the top and in communication at the bottom with said tank, individual freezing means surrounding each mold, and devices for connecting said individual means to either the hot or cold system.

3. Ice making apparatus comprising in combination, fluid cooling means and fluid heating means, a system of pipes for handling the cold fluid, a system of pipes for handling the warm fluid, a water tank, a plurality of upright freezing molds submerged therein open at the top and in communication at the bottom with said tank, a fluid conduit surrounding each mold, means for connecting said fluid conduits to either the hot or the cold system, and a line for delivering fluid under pressure to the interior of said molds to agitate the water therein.

4. Ice making apparatus comprising in combination, a water tank, a plurality of freezing molds receiving water therefrom open at the top and in communication at the bottom with said tank and having ice forming mold walls in contact with the water to be frozen, individual freezing and thawing means for each mold comprising devices for providing each mold with a rapidly circulating wrapping of freezing or thawing fluid in contact with the ice forming mold walls, and a system of piping for supplying freezing and thawing fluid to said individual freezing and thawing means.

5. Ice making apparatus comprising in combination, a water tank, means for causing a continuous flow of fresh water therethrough, a plurality of upright jacketed freezing molds therein open at the top and in communication with said tank at the bottom, a freezing fluid supply pipe, a freezing fluid return pipe, and connections between the individual jackets and both of said pipes.

6. Ice making apparatus comprising in combination, a water tank, a plurality of freezing molds submerged therein open at the top and in communication at the bottom with said tank, and comprising a flat coiled conduit forming a continuous freezing zone, means for supplying freezing fluid or thawing fluid at pleasure to the said conduits and for withholding either therefrom at pleasure, and means for delivering fluid under pressure below said molds to agitate the water within them.

7. Ice making apparatus comprising in combination, a water tank, a plurality of upright molds receiving water therefrom open at the top and in communication at the bottom with said tank, said molds each having double walls constructed to form a continuous conduit covering the surface of that mold, the said molds having transverse bottoms and a hole therethrough, and a pipe below the mold bottoms for delivering fluid through the openings in the bottom of the molds to agitate the water therein.

8. Ice making apparatus comprising in combination, a water tank, a plurality of upright freezing molds receiving water therefrom having freezing and thawing jackets surrounding them and having transverse bottoms provided with a hole whereby communication between the interior of the molds and the tank is secured, and with means for insulating them from the water beneath them, means for conducting freezing or thawing fluid to said jackets, and a pressure line for supplying fluid under pressure to the interior of said molds.

9. Ice making apparatus comprising in combination, a water tank, a plurality of upright freezing molds therein having freezing and thawing jackets surrounding them and having bottoms provided with a hole whereby communication between the interior of the molds and the tank is secured, means for conducting freezing or thawing fluid to said jackets, a pressure line for supplying fluid under pressure to the interior of said molds, and a pump in communication with said tank for supplying water therefrom to said line.

10. Ice making apparatus comprising in combination, a water tank, means for supplying said tank with water, upright molds receiving water from said tank open at the top and having transverse bottoms provided with insulating means and with a hole through which water may pass to the mold, said molds having ice forming mold walls in contact with the water to be frozen, means for applying freezing and thawing fluid directly to the ice forming mold walls, means for supplying freezing fluid and thawing fluid at different times to said applying means and for returning it therefrom, and a supply line for delivering fluid under pressure to agitate the water in the molds.

11. Ice making apparatus comprising in combination, a water tank, means for supplying said tank with water, upright molds in said tank open at the top and in communication at the bottom with said tank and having ice forming mold walls in contact with the water to be frozen, means for applying freezing and thawing fluid directly to the ice forming mold walls, means for supplying freezing fluid and thawing fluid at different times to said applying means and for returning freezing fluid therefrom, and a supply line for delivering fluid under pressure to agitate the water in the molds.

12. Ice making apparatus comprising in combination, a water tank, upright freezing molds receiving water from said tank open at the top and in communication at the bottom with said tank, freezing means surrounding each mold, supply and return headers for freezing fluid, and connections from a supply header to a return header each including the freezing means for a single mold only.

13. Ice making apparatus comprising in combination, a water tank, a plurality of upright molds receiving water from said tank, open at the top and in communication at the bottom with the tank, a pair of freezing fluid supply and return headers, a pair of thawing fluid supply and return headers, freezing and thawing means for said molds, connections between said freezing and thawing means and both of said pairs of headers, and means for varying the said connections to place part of said freezing and thawing means in communication with one pair of headers, and part in communication with the other pair of headers at the same time.

14. Ice making apparatus comprising in combination, a water tank, a plurality of upright molds receiving water therefrom and in communication therewith at the bottom, freezing and thawing jackets for said molds, a system of piping for circulating freezing fluid, a system of piping for circulating thawing fluid, connections between said freezing and thawing jackets and both supply systems, and means for varying said connections to include said freezing and thawing jackets in either system and exclude them from the other.

15. Ice making apparatus comprising in combination, a water tank, a plurality of upright molds receiving water therefrom and in communication at the bottom therewith, freezing and thawing means for said molds, a freezing fluid supply header and a freezing fluid return header, a thawing fluid supply header and a thawing fluid return header, connections between said freezing and thawing means and said headers and means for placing selected freezing and thawing means in communication at will with a pair of supply and return headers of either kind.

16. Ice making apparatus comprising in combination, a water tank, a plurality of upright molds receiving water from said tank open at the top and in communication at the bottom with the tank, individual freezing and thawing means for each mold, a freezing fluid supply header and a thawing fluid supply header, a freezing fluid return header and a thawing fluid return header, connections between the freezing and thawing means of each individual mold and two pairs of said supply and return headers, said individual freezing and thawing means being connected in multiple, and valves governing said connections.

17. In ice making apparatus, a rectangular mold having means surrounding it for providing it with a rapidly circulating band of freezing or thawing fluid constituting a continuous covering for its freezing and thawing zone, an inlet and an outlet for said means on opposite sides of said mold and at the top thereof.

18. In ice making apparatus, a freezing mold, freezing means constituting a continuous covering for its freezing and thawing zone and comprising a continuous conduit winding around the mold from its top to its bottom and back to its top, an inlet at one end of said conduit and an outlet at the other for freezing fluid.

19. In ice making apparatus, a freezing mold, freezing means surrounding said mold and comprising a continuous conduit winding spirally around the mold from its top to its bottom and back spirally to its top, both spirals being in the same plane and constituting a continuous sheath or covering for the mold, an inlet at one end in the said conduit and an outlet at the other for freezing fluid.

20. In ice making apparatus, a double walled mold having in the space between the walls a spiral division or partition forming a double spiral passage therein returning on itself and forming a complete wrapping for the freezing zone of the mold.

21. In ice making apparatus, a rectangular mold having a double wall comprising an inner wall and an outer shell having distinct inwardly projecting ridges formed from the body thereof and constituting a continuous spiral division or partition secured to said inner wall and dividing the space between the walls into a continuous conduit forming a jacket or sheath for the mold, and an inlet and outlet for said conduit.

22. In ice making apparatus, a double-walled mold having a series of distinct depressions in its outer wall constituting a continuous division or partition and forming a continuous double spiral passage or conduit around the mold returning on itself, an inlet to one end of said passage and an outlet from the other.

23. In ice making apparatus, a double-walled mold having slanting depressions in its outer wall ending adjacent upright lines of the fold and in line each with another and having angular ends forming miter corners when the mold is assembled.

24. Ice making apparatus comprising in combination, a water tank, a plurality of upright molds submerged therein open at the top and in communication therewith at the bottom, insulated freezing and thawing means for individual molds, a system for circulating freezing fluid, and connections between said system and means.

25. Ice making apparatus comprising in combination, a water tank, a plurality of upright insulated molds submerged therein open at the top and in communication therewith at the bottom having an inner wall and having a passage between the insulation and the inner wall of the mold, means for supplying freezing fluid or thawing fluid to said passages and for returning it therefrom, and a jet line for supplying fluid under pressure below said molds to agitate the fluid therein.

26. Ice making apparatus comprising in combination, a water tank, a plurality of upright molds submerged therein open at the top and in communication therewith at the bottom and having freezing and thawing jackets and insulating air jackets outside said freezing and thawing jackets, a system for circulating freezing fluid and thawing fluid, and connections between said systems and means.

27. Ice making apparatus comprising in combination, a water tank, a plurality of upright molds submerged therein open at the top and in communication therewith at the bottom and having freezing and thawing jackets and insulating air jackets outside said freezing and thawing jackets and extending above the same, a system for circulating freezing fluid and thawing fluid, and connections between said system and means.

28. Ice making apparatus comprising in combination, a water tank, a plurality of upright freezing molds submerged therein and in communication therewith at the top and bottom, individual freezing and thawing means surrounding each individual mold, headers for supplying freezing or thawing fluid to the said individual freezing and thawing means, insulation surrounding the outside of said freezing and thawing means, and means for agitating the water in the molds.

29. Ice making apparatus comprising in combination, a water tank, upright molds open at the top and in communication at the bottom with said tank, freezing means for individual molds, freezing fluid supply and freezing fluid return headers, means for supporting the molds, and disconnectible connections between said freezing means and said headers whereby the molds are individually removable without interference with the operation of the rest of the molds.

30. Ice making apparatus comprising in combination, a water tank, a series of rows of upright jacketed freezing molds receiving water from said tank open at the top and in communication therewith at the bottom, a series of freezing fluid supply headers each connected to the molds of two adjacent rows, a series of freezing fluid return headers alternating with the supply headers and each connected to the molds of two adjacent rows, and means for circulating freezing fluid through said headers.

31. Ice making apparatus comprising in combination, a water tank, a plurality of upright molds receiving water from said tank arranged in parallel rows open at the top and in communication with the tank at the bottom, a supply header, and return header for each row, and freezing and thawing means surrounding each mold, said means being connected in parallel with their supply and return headers.

32. Ice making apparatus comprising in combination, a water tank, a plurality of upright freezing molds receiving water from said tank arranged in rows, freezing and thawing means surrounding each mold and individual thereto, a supply header and a return header for each row of molds, connections between each of said freezing and thawing means and a supply header and between each of said means and a return header, and means for circulating freezing or thawing fluid through said freezing and thawing means.

33. Ice making apparatus comprising in combination, a water tank, a plurality of upright molds receiving water from said tank open at the top and in communication therewith at the bottom, freezing and thawing means individual to each mold, a system for circulating freezing fluid and thawing fluid, connections between said system and means, and devices for varying said connections to enable one part of the apparatus to be subjected to freezing while another is being subjected to thawing.

34. Ice making apparatus comprising in combination, a water tank, a plurality of upright molds receiving water from said tank and in communication at the bottom therewith, individual freezing and thawing devices for each mold, a freezing fluid supply and return system, a thawing fluid supply and return system, and means for connecting the freezing and thawing devices for any individual mold at will with either system.

35. Ice making apparatus comprising in combination, a water tank, a plurality of upright molds open at the top and in communication with the tank at the bottom and arranged in parallel rows, a plurality of pairs of supply headers and return headers for freezing fluid, a plurality of pairs of supply headers and return headers for thawing fluid, individual freezing and thawing means surrounding said molds, connections between the freezing and thawing means of each individual mold and a pair of each kind, and means for varying the connections to place any individual freezing and thawing means in communication at will with either of said pairs.

36. Ice making apparatus comprising in combination, a water tank, a plurality of freezing molds receiving water from said tank open at the top and in communication with the tank at the bottom and located in parallel rows, freezing and thawing means surrounding each individual mold, freezing fluid supply and return headers, thawing fluid supply and return headers, the freezing and thawing means of the individual molds being connected in parallel with each other to both said freezing and thawing supply and return headers, and valves in the connections whereby freezing fluid or thawing fluid may be caused to flow through said individual freezing and thawing means as desired.

37. Ice making apparatus comprising in combination, a water tank, a plurality of upright molds receiving water from said tank open at the top and in communication with the tank at the bottom and arranged in rows, individual freezing and thawing means for each mold, a freezing fluid supply header and a thawing fluid supply header for each row of molds, a freezing fluid return header and a thawing fluid return header for each row of molds, connections between the freezing and thawing means of each individual mold and two pairs of said supply and return headers, and valves governing the connections to subject individual molds to freezing or thawing at will.

38. Ice making apparatus comprising in combination, a water tank, a plurality of freezing molds receiving water therefrom open at the top and having transverse bottoms provided with holes whereby they are in communication with said tank, and with air trapping means open to the tank, and devices for delivering air to said air trapping means.

39. Ice making apparatus comprising in combination, a water tank, a plurality of freezing molds receiving water from said tank open at the top and having bottoms provided with holes whereby they are in communication with said tank, an air line having means to deliver air to the under side of the bottom, and devices for conducting said air through the hole in the bottom to the interior of the mold.

40. Ice making apparatus comprising in combination, a water tank, a plurality of upright molds receiving water from said tank having a transverse bottom provided with a hole whereby the mold is in communication with said tank, and having a wall extended down below said bottom, a shell surrounding said hole and depending from said bottom, the space below the bottom between the depending wall and shell forming a water sealed air trapping space, an air pipe provided with means for introducing air under pressure to said space, and devices for delivering it therefrom to the interior of the mold.

41. In ice making apparatus, a mold having a transverse bottom provided with a hole surrounded by an open ended shell depending from said bottom and having also a wall depending from its bottom and inclosing said shell to form an open bottomed space below the bottom between the depending shell and wall.

42. In ice making apparatus, a mold having a transverse bottom provided with a hole surrounded by an open ended shell depending from said bottom and having also a wall depending from its bottom and inclosing said shell to form an open bottomed space below the bottom between the depending shell and extended wall, and a perforated bridge extending across said shell.

43. Ice making apparatus comprising in combination, a water tank, upright molds receiving water from said tank open at the top and in communication at the bottom with said tank and having mold walls and transverse bottoms in contact with the contents of the mold, and means for applying freezing fluid directly to the mold walls and for applying thawing fluid directly to the mold walls and to the transverse bottom.

44. Ice making apparatus comprising in combination, a water tank, a plurality of upright molds receiving water from said tank, freezing and thawing means for said molds, said molds having transverse bottoms provided with holes whereby the molds are in communication with the tank, said bottoms having auxiliary thawing chambers, and means for delivering thawing fluid to said auxiliary chambers.

45. Ice making apparatus comprising in combination, a water tank, a plurality of upright molds receiving water from the tank, open at the top and having a bottom provided with a hole whereby the mold is in communication with the tank, freezing and thawing means for said molds, a shell depending from the bottom of the mold and surrounding the hole therein, a wall depending from said bottom and inclosing said shell and leaving a space between said wall and shell directly beneath the bottom, and a thawing fluid supply pipe to deliver thawing fluid to said space.

46. Ice making apparatus comprising in combination, a water tank, a plurality of upright molds receiving water from the tank, open at the top and having a bottom provided with a hole whereby the mold is in communication with the tank, freezing and thawing means for said molds, a shell depending from the bottom of the mold and surrounding the hole therein, a wall depending from said bottom and inclosing said shell and leaving an open bottomed air trapping space between said wall and shell directly beneath the bottom, and means for delivering cold or warm air as desired to said space.

47. In ice making apparatus, a mold provided with freezing and thawing means and with a transverse bottom having beneath it an air pocket and provided with a hole surrounded by a shell depending from said bottom and constituting one wall of said pocket.

Signed by me at New York city, New York, this 11th day of April, 1910.

EDWARD T. WILLIAMS.

Witnesses:
 CHAS. WESTERBERG,
 HARRY T. BERNHARD.